(12) United States Patent
Beaverson et al.

(10) Patent No.: US 9,165,005 B2
(45) Date of Patent: Oct. 20, 2015

(54) METHOD AND APPARATUS UTILIZING NON-UNIFORM HASH FUNCTIONS FOR PLACING RECORDS IN NON-UNIFORM ACCESS MEMORY

(75) Inventors: Arthur J. Beaverson, Boxborough, MA (US); Paul Bowden, Berlin, MA (US); Sowmya Manjanatha, Westford, MA (US); Jinsong Huang, Westford, MA (US)

(73) Assignee: SimpliVity Corporation, Westborough, MA (US)

( * ) Notice: Subject to any disclaimer, the term of this patent is extended or adjusted under 35 U.S.C. 154(b) by 379 days.

(21) Appl. No.: 13/404,640

(22) Filed: Feb. 24, 2012

(65) Prior Publication Data
US 2013/0227195 A1 Aug. 29, 2013

(51) Int. Cl.
*G06F 17/30* (2006.01)
*G06F 12/06* (2006.01)
*G06F 12/02* (2006.01)
*G06F 12/08* (2006.01)

(52) U.S. Cl.
CPC .... *G06F 17/30097* (2013.01); *G06F 17/30949* (2013.01); *G06F 12/0246* (2013.01); *G06F 12/0864* (2013.01); *G06F 2212/7201* (2013.01); *G06F 2212/7202* (2013.01)

(58) Field of Classification Search
CPC ............ G06F 12/0246; G06F 12/0864; G06F 12/1018; G06F 2212/2012; G06F 2212/72; G06F 17/30949; G06F 17/30094; G06F 17/30097
USPC .......................................... 711/103, 202, 216
See application file for complete search history.

(56) References Cited

U.S. PATENT DOCUMENTS 7,913,051 B1* 3/2011 Todd et al. ................... 711/165
2010/0332846 A1* 12/2010 Bowden et al. .............. 713/189

OTHER PUBLICATIONS

Kang et al. "Object-based SCM: An Efficient Interface for Storage Class Memories", IEEE 27th Symposium on Mass Storage Systems and Technologies (MSST) [held May 23-27, 2011]. previously disclosed in the IDS of Jun. 25, 2013.*
Jun. 11, 2013 International Search Report and Written Opinion in corresponding PCT/US2013/027277.
Yangwook, et al., Mass Storage Systems and Technologies (MSST), 2011 IEEE 27th Synposuim On, IEEE, May 23, 2011, pp. 1-12, "Object-based SCM: An Efficient Interface for Storage Class Memories".

(Continued)

*Primary Examiner* — Charles Rones
*Assistant Examiner* — Andrew Russell
(74) *Attorney, Agent, or Firm* — Novak Druce Connolly Bove + Quigg LLP

(57) ABSTRACT

Method and apparatus for storing records in non-uniform access memory. In various embodiments, the placement of records is localized in one or more regions of the memory. This can be accomplished utilizing different ordered lists of hash functions to preferentially map records to different regions of the memory to achieve one or more performance characteristics or to account for differences in the underlying memory technologies. For example, one ordered list of hash functions may localize the data for more rapid access. Another list of hash functions may localize the data that is expected to have a relatively short lifetime. Localizing such data may significantly improve the erasure performance and/or memory lifetime, e.g., by concentrating the obsolete data elements in one location. Thus, the two or more lists of ordered hash functions may improve one or more of access latency, memory lifetime, and/or operation rate.

20 Claims, 14 Drawing Sheets

(56) References Cited

OTHER PUBLICATIONS

Dongchul, et al., "Hot Data Identification for Flash-Based Storage Systems Using Multiple Bloom Filters", Dongchul, et al., Mass Storage Systems and Technologies (MSST), 2011 IEEE 27th Synposium On, IEEE, May 23, 2011, pp. 1-11.

CRUSH: Controlled, Scalable, Decentralized Placement of Replicated Data, Sage A. Weil et al., SC2006 Nov. 2006, Tampa, Florida, USA, 0-7695-2700-0/06 $20.00 2006 IEEE.

Dynamic and Redundant Data Placement (Extended Abstract), Distributed Computing Systems, 2007, ICDCS '07, 27th International Conference on Jun. 25-27, 2007, Brinkmann, A., Scheideler, C.

Kinesis: A new approach to replica placement in distributed storage systems, ACM Transactions on Storage (TOS), vol. 4 Issue 4, Jan. 2009, ACM New York, NY USA, John MacCormick et al.

Handling heterogeneous storage devices in clusters, Andre Brinkmann and Toni Cortes, Cluster and '07 Proceedings of the 2007 IEEE International Conference on Cluster Computing, IEEE Computer Society, Washington, DC USA 2007.

Disk Labeling Techniques: Hash-Based Approaches to Disk Scaling Shu-Yuen Didi Yao et al., {didiyao, shahabi@usc.edu, The VLDB Journal, vol. 14, No. 2 (2005), 222-237, DOI: 10.1007/s00778-004-0124-6.

* cited by examiner

METHOD AND APPARATUS UTILIZING NON-UNIFORM HASH FUNCTIONS FOR PLACING RECORDS IN NON-UNIFORM ACCESS MEMORY

FIELD OF THE INVENTION

The present invention relates to computer data dictionaries and to methods and apparatus for placement of records in non-uniform access memory.

BACKGROUND

An index, also known as data dictionary or associative array, is a data structure and associated algorithms that are used to map identifying values, known as keys, to associated values, also known as satellite data. The concatenation of the key and its satellite data comprise one embodiment of a record data entry.

In one example, an index is broken into buckets, each bucket having enough room for up to N record data entries, for example, 30. The bucket has a size field e.g., 512 bytes, indicating how many records can fit in the bucket. Record data entries may be stored in the bucket in sorted order, in time order (the order in which they arrive), or an indirection table may be used for storing the record data entries in an arbitrary order. Various algorithms have been used for allocating record data entries to buckets, typically with a goal of uniformly distributing the record data entries across all buckets. In some examples, multiple levels of buckets are provided to handle overflow if an initial bucket is filled.

Many applications require an index with a very large number of entries, thus requiring gigabtyes of memory to store the associated data structures, and a very high operation rate, e.g., hundreds of thousands of operations per second. Some memory technologies, such as DRAM, may provide the necessary performance, but are not dense enough to economically store such a large number of records. Other memory technologies, such as disk technology, may have the density, but not the required performance. Thus, there is an ongoing need for a memory technology that can meet both the storage size and operation rate requirements for generating and maintaining a large number of records.

SUMMARY OF THE INVENTION

In accordance with the present invention, a new method and apparatus are provided for placing record data entries (e.g., for an index) in non-uniform access memory. In various embodiments, the placement of record data entries (records) is localized in one or more regions of the memory, where different regions may comprise different types of memory. This can be accomplished utilizing different ordered lists of hash functions to preferentially map records to different regions of the memory to achieve one or more performance characteristics or to account for differences in the underlying memory technologies. For example, one ordered list of hash functions may localize the records for more rapid access. Another ordered list of hash functions may localize the records that are expected to have a relatively short lifetime. Localizing such records may significantly improve the performance and/or memory lifetime, e.g., by concentrating the obsolete records in one location. Thus, the two (or more) lists of ordered hash functions may improve one or more of access latency, memory lifetime, and/or operation rate.

In accordance with one embodiment of the invention, a method of storing index records in a non-uniform access memory is provided, each record comprising a record key and wherein multiple hash functions are used to map records to logical buckets for translation to physical locations in the non-uniform access memory, the method comprising:

applying a first ordered list of hash functions to a record key of a first type of record to preferentially map the first record type to a first region of the memory; and applying a second ordered list of hash functions to a record key of a second type of record to preferentially map the second record type to a second region of the memory not limited to the first region.

According to one embodiment, a bucket translation table is maintained for mapping logical bucket identifiers to physical bucket locations of the memory, wherein the logical bucket identifiers are generated by the applying step and the table comprises a mapping of logical bucket identifier to physical bucket location where the associated record is stored in the memory.

According to one embodiment, the first record type has a greater expected access requirement in the memory than the second record type.

According to one embodiment, the first record type has a lower expected lifetime in the memory than the second record type.

According to one embodiment, the first record type has a greater expected referencing requirement than the second record type.

According to one embodiment, the first region of memory has a faster access characteristic than the second region of the memory.

According to one embodiment, the first region of memory has a longer expected memory lifetime than the second region of the memory.

According to one embodiment, the nonuniform access memory comprises computer storage media that have different characteristics including read access time, write access time, write-once limitations, data location or address specific access times, multiple-step writing or reading processes and/or other constraints that result in accesses to different addresses exhibiting materially different access characteristics.

According to one embodiment, the memory comprises one or more of flash, phase-change, solid state, DRAM and hard disk memory devices.

According to one embodiment, the memory comprises a flash memory device which includes a plurality of erase blocks, each erase block comprises a plurality of pages, and each page comprising a plurality of buckets.

According to one embodiment, the method includes performing a scavenging process to generate free erase blocks.

According to one embodiment, the memory comprises a physical device layer characterized by non-uniform read and write access.

According to one embodiment, the memory includes erasing the first region, including rewriting valid records in the first region to another location in memory and erasing one or more blocks in the first region.

According to one embodiment, the method includes modifying one or more of:

the number or type of hash functions in the first ordered group of hash functions;

the number or type of hash functions in the second ordered group of hash functions; and performance characteristics of the first and/or second regions of the memory.

According to one embodiment, the method includes performing logical bucket operations for reading and writing to physical bucket locations which store the records.

According to one embodiment, a computer program product is provided comprising program code which, when executed by a processor, performs the described method steps.

According to one embodiment of the invention, a computer system is provided including a server having one or more processors and a memory storing one or more programs for execution by the one or more processors, for performing the described method steps.

In accordance with another embodiment of the invention, a computer system is provided comprising a non-uniform access memory containing index records stored in physical bucket locations of the memory, each record comprising a record key the system including:

a hash value generator for hashing a record key to generate a logical bucket identifier;

a translation component for mapping the logical bucket identifier to a physical bucket location of the memory where a record associated with the record key is stored; and;

wherein the hash value generator:

applies a first ordered list of hash functions to a record key of a first type of record to preferentially map the first record type to a first region of the memory; and applies a second ordered list of hash functions to a record key of a second type of record to preferentially map the second record type to a second region of the memory not limited to the first region.

BRIEF DESCRIPTION OF THE DRAWINGS

It is understood that the invention includes two or more ordered lists of hash functions for preferentially mapping records to select regions of the memory.

DETAILED DESCRIPTION

Figure 1:
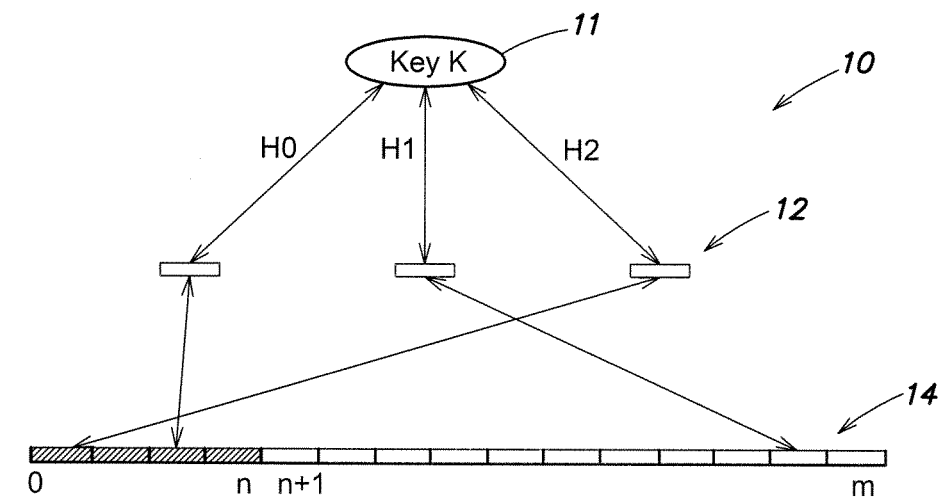
FIG. 1 is a schematic high level system architecture for one embodiment of the invention, illustrating the storing of index records in a non-uniform access memory by applying an ordered list of hash functions to a record key.
Figure 1:
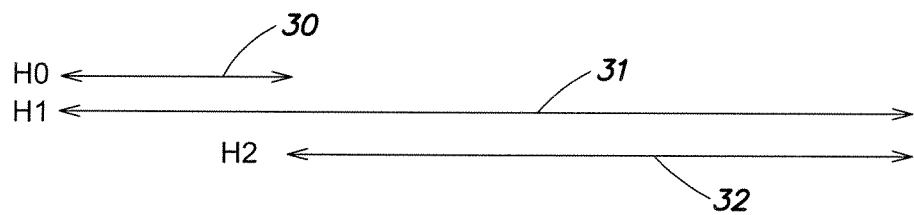
Figure 1:
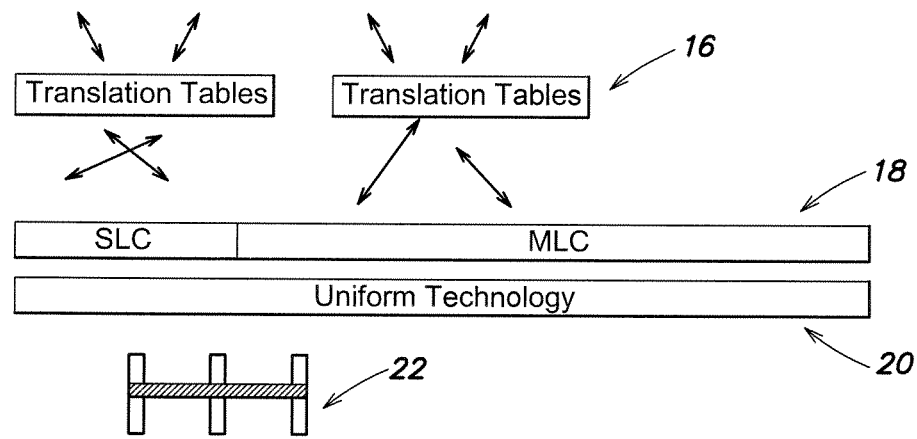

Various embodiments of the present invention are now described with reference to the drawings. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the terms "data" and "data element" are used interchangeably. As used herein, data means an opaque collection of data, e.g., any sequence of symbols (typically denoted "0" and "1") that can be input into a computer, stored and processed there, or transmitted to another computer. As used herein, data includes metadata, a description of other data. Data written to a storage system as described herein may be data elements of the same size, or data elements of variable sizes. Some examples of data include information, program code, program state, program data, other data, and the like.

A "storage system" as used herein may be any system or application for storing data to storage, for example a file system, a block storage device, or other system. A storage system may use an identifier or name to reference each data element in storage. In one example, the name is a globally unique identifier (GUID), such as a hash of the data content, preferably a cryptographic hash or collision resistant hash of the data content. Other naming conventions are possible, as long as each data element has a name within the storage system that permits reconstituting the data stored to the user. In one embodiment a central server generates the names. Data names are usually fixed length binary strings intended for use by programs, as opposed to humans. An index (sometimes as referred to as a dictionary or catalog) of all the data may be needed by the storage system in order to access (locate) each data element. Each record in the index may contain the name of a data element, its logical and/or physical location (address), and other information concerning the respective data element. In one embodiment, each index entry includes a pointer that points to a physical block address on a disk where the data object is stored. In one embodiment a fixed algorithm may be used to locate the physical location on a disk where the data is stored.

According to one embodiment of the invention, a data placement method and apparatus are provided for use with a storage system that stores data on disk storage. The storage system may comprise for example a file system, a block storage device, or other storage system for storing data. Data written to such storage systems typically comprises many small (e.g., 4 KB) pieces of data, herein referred to interchangeably as data or data elements, which data may be of the same or variable sizes.

As used herein, non-uniform access memory means computer storage media that have different characteristics including read access time, write access time, write-once limitations, data location or address specific access times, multiple-step writing or reading processes and/or other constraints that result in accesses to different addresses exhibiting materially different access characteristics. Non-uniform access memory includes (as one example) heterogeneous memory, namely combinations of different computer storage media viewed as a single logical and/or contiguous memory.

As used herein, computer storage media includes volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

A. Record Placement Utilizing Non-Uniform Hash Functions

FIG. 1 is a high level schematic illustration of a process according to one embodiment of the invention utilizing non-uniform multiple N hash functions for placing records in non-uniform access memory. A record key K is hashed using hash functions, three in this case, namely H0, H1 and H2, each resulting in a logical bucket identifier. One of the hash functions, H0, does not address all of the buckets in the logical bucket space 14; here H0 addresses a subset of buckets 0 to n which is less than all buckets 0 to m. Thus, FIG. 1 shows: hash functions where for a Key value (x):

$H0(x)=\{0 \ldots n\}$
$H1(x)=\{0 \ldots m\}$
$H2(x)=\{n+1 \ldots m\}$ and for any key (x)

$H0(x)<>H1(x)<>H2(x)$

When the key K is hashed using the 3 hash functions, 3 candidate bucket identifiers are produced. The first bucket identifier, from the hash function H0, can only target the first few buckets 0 . . . n. The other hash functions H1 can target any bucket, and H2 can target buckets that are not in the range of bucket addresses that can be generated by H0. This is illustrated schematically in FIG. 1 by a first line 30 spanning buckets 0 to n for hash function H0, a second line 31 scanning buckets 0 to m for hash function H1, and a third line 32 spanning buckets n+1 to m for hash function H2. By utilizing an ordered set of such non-uniform hash functions, at least one of the hash functions covering less than all (a subset) buckets, a method is provided for preferably mapping record keys to select (localized) memory regions in various memory technologies while efficiently utilizing the memory. The logical bucket ranges H0, H1 and H2 may be mapped to specific underlining memory technologies, e.g., having different access characteristics. They may also be mapped to the same memory technology, but concentrating specific buckets into a limited defined memory region, thus enhancing performance and/or memory endurance.

As shown at the bottom of FIG. 1, one or more translation tables 16 map the logical bucket space 14 to physical locations in the non-uniform access memory. In one example, the memory 18 comprises different flash technologies, such as MLC and SLC. SLC is a type of NAND flash memory that includes single-level cell (SLC) devices, wherein each cell stores only one bit of information. A newer NAND flash memory technology utilizes multi-level cells (MLC) devices, which can store more than one bit per cell. Different flash technologies have different performance characteristics.

In a second example, a uniform technology memory 20 can be used while concentrating certain data, such as the subset of buckets addressed by H0, in one region of the memory 20, again for performance or other reasons (e.g., lifetime).

As a further example, the memory technology 22 may comprise a plurality of flash chips, and the subset of logical buckets covered by H0 may localize the data in a region stripped across the flash chips. The stripe size may be a multiple of the erase block size, for improving the erase performance. The stripe can be moved up or down across the plurality of flash chips.

These are just three examples of different non-uniform memory technologies and different methods for placing data records utilizing non-uniform hash functions to select regions of such memory.

B. Record Operations

Figure 2A:
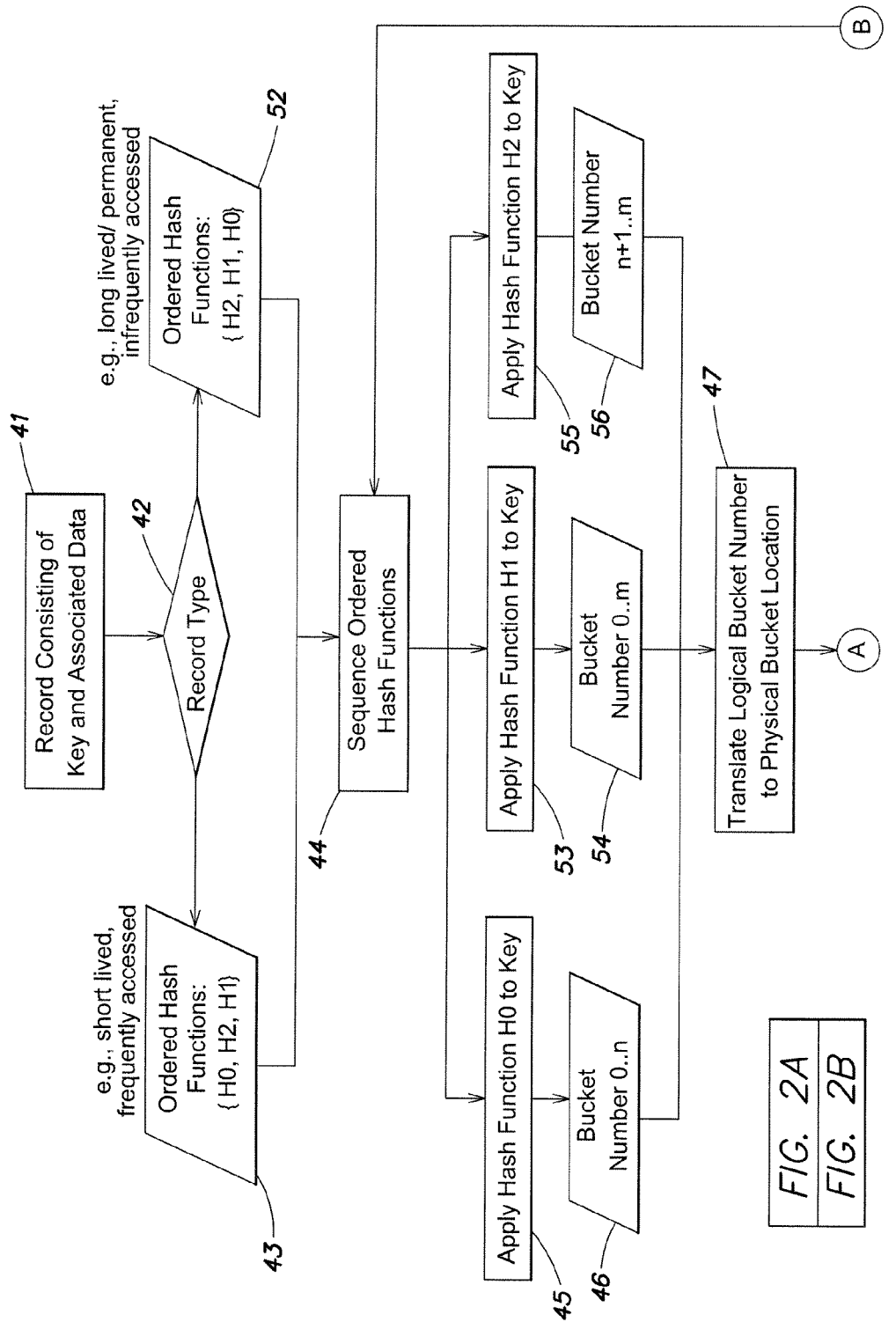
FIG. 2 is a flowchart of a process according to one embodiment of the invention for inserting a record into the memory.
Figure 2B:
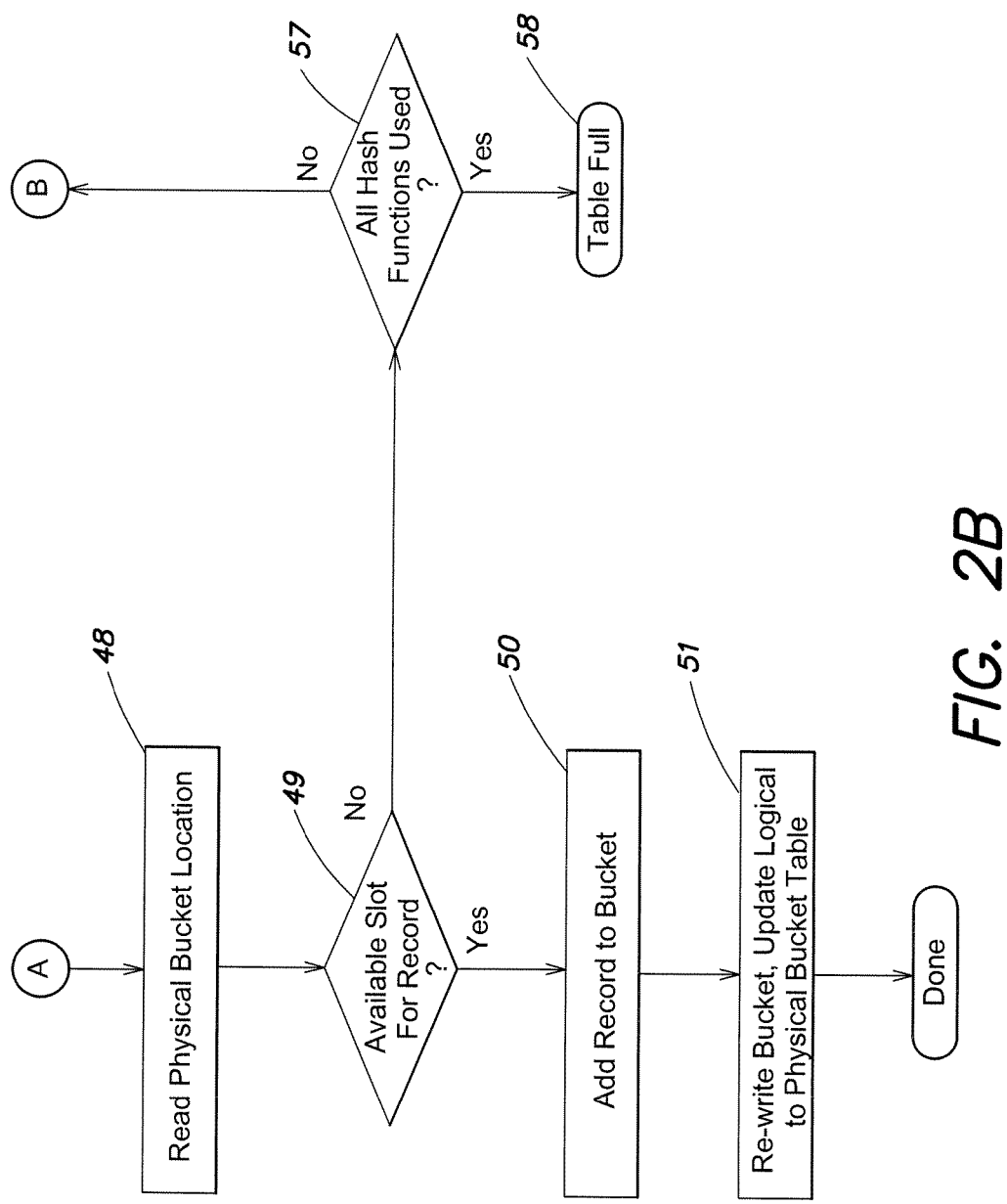
Figure 3A:
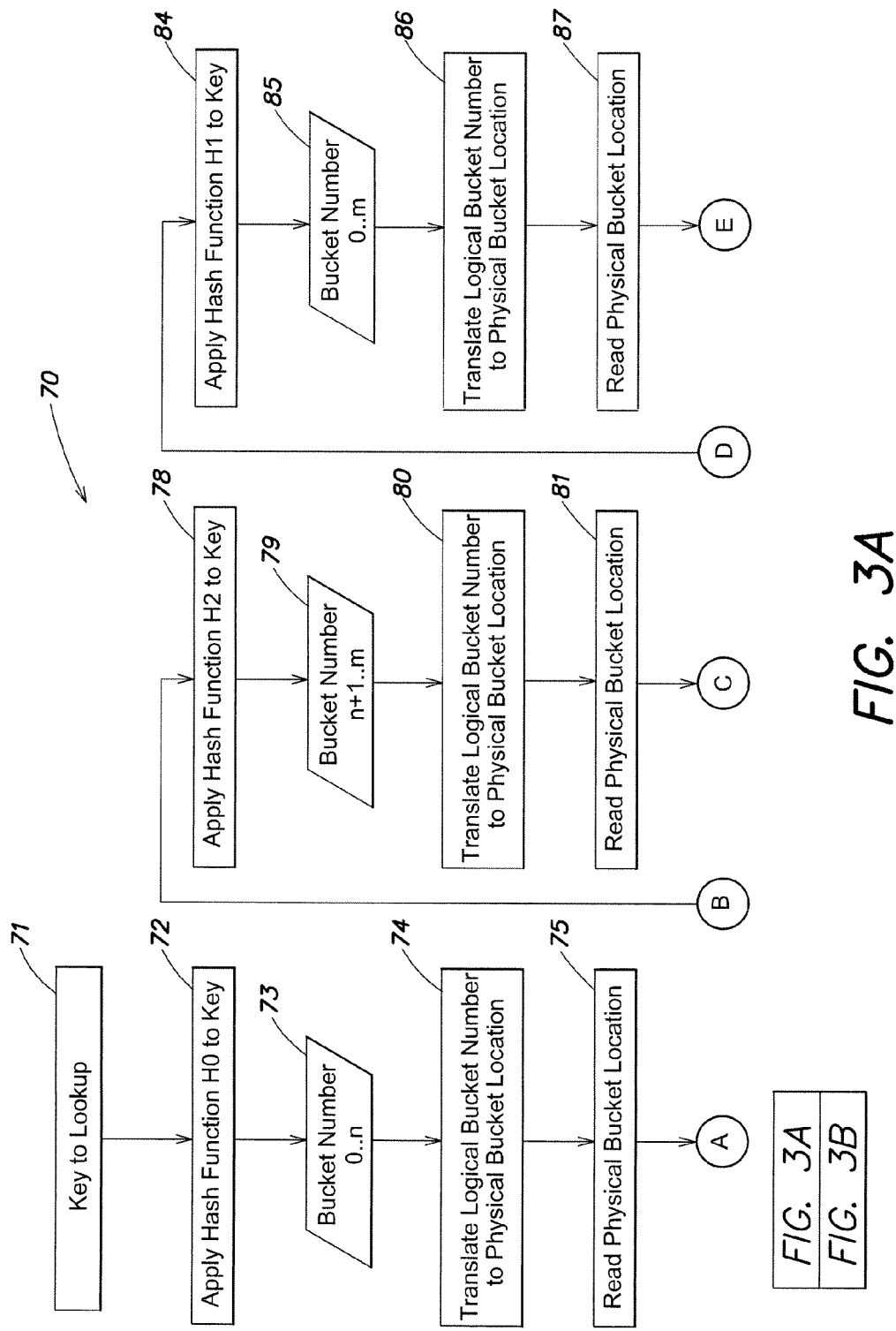
FIG. 3 is a flowchart of a process according to another embodiment of the invention for looking up a record.
Figure 3B:
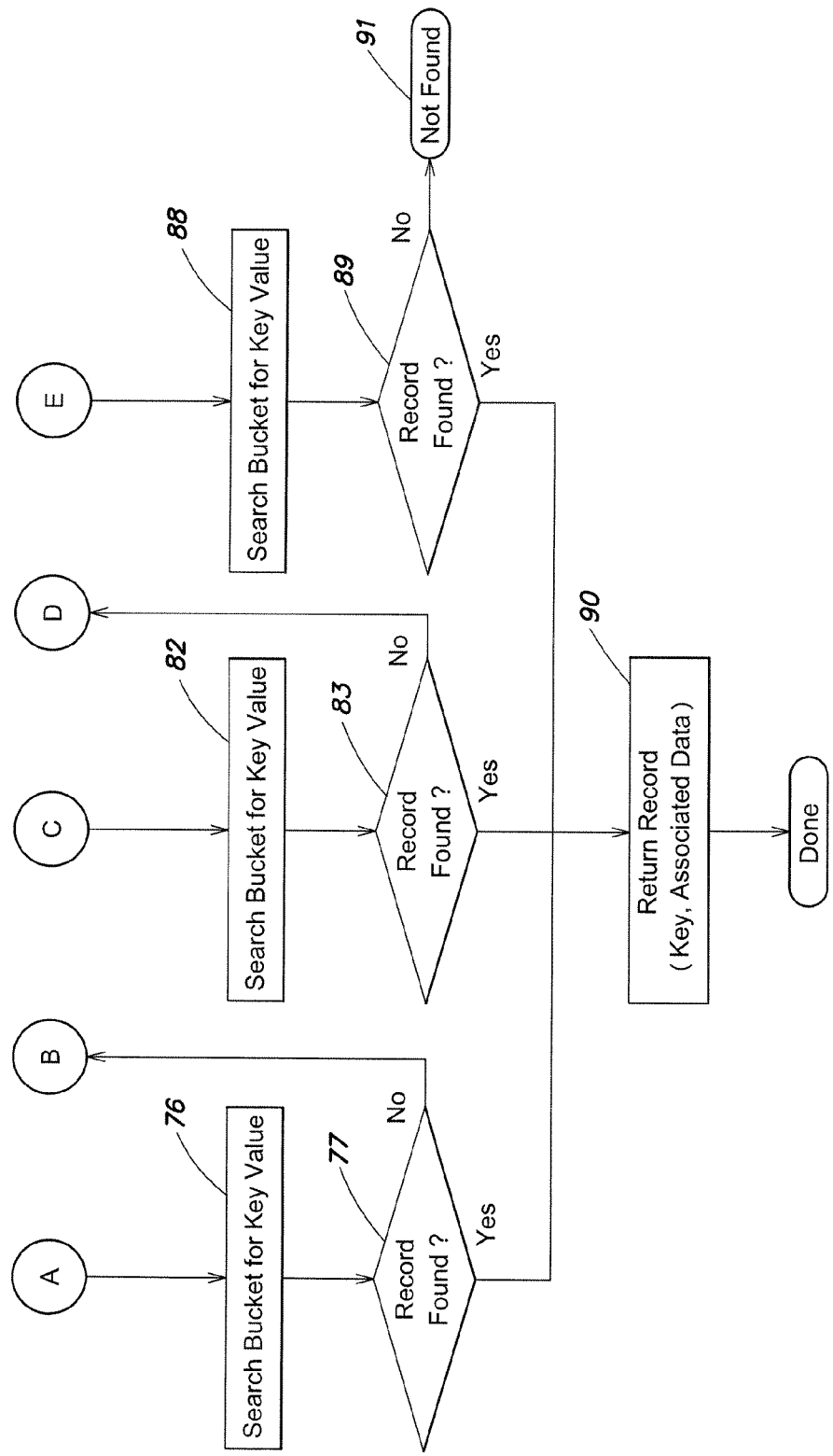
Figure 4:
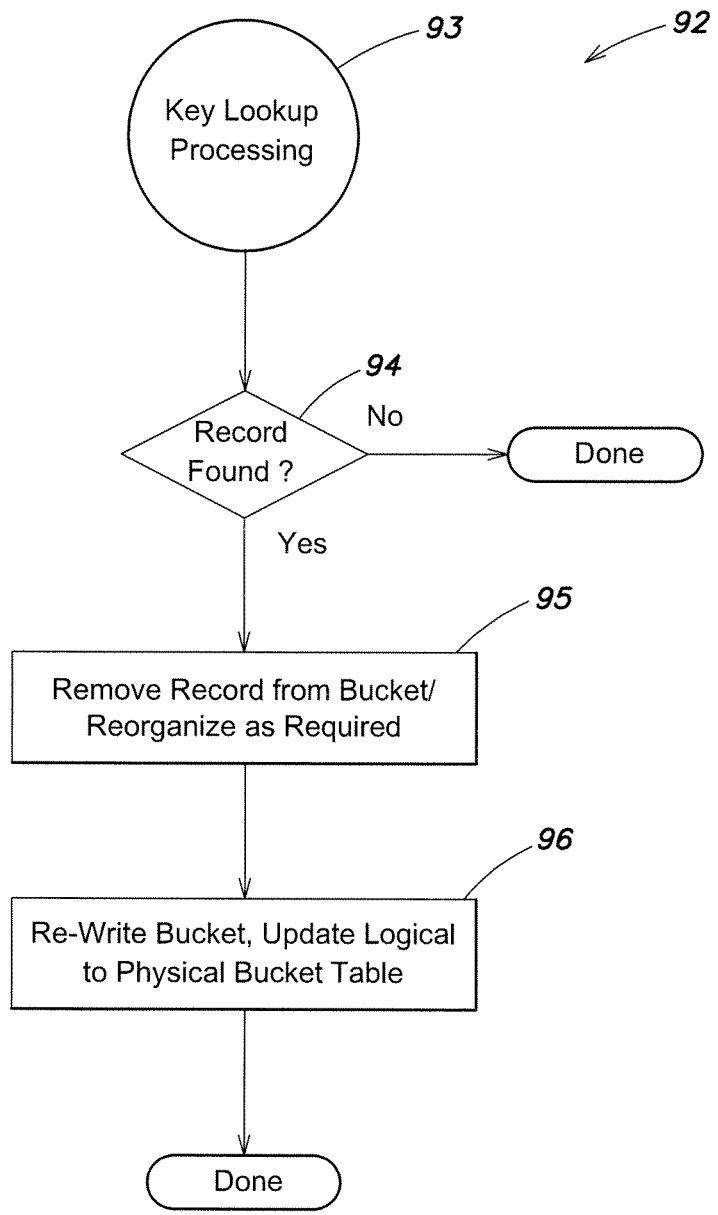
FIG. 4 is a flowchart of a process according to another embodiment of the invention for deleting a record.

FIGS. 2-4 illustrate three types of record operations for inserting, looking up, and deleting records respectively according to one embodiment of the invention.

FIG. 2 illustrates one embodiment of a method 40 of inserting a record. Beginning at step 41, a record is provided which in this example includes a record key and associated data. As previously described, one such type of record is an index record, wherein a key is mapped to a location. In other example, a key is mapped to an access permission. In another example, a key is mapped to a value representing the last time the data was modified. In another example, a key is mapped to a characteristic of the data. The data itself is stored in a storage device (not shown), and the data may be hashed to generate the record key. The associated data may be a pointer to a physical block address in the storage system where the data is stored. This is only one example and a person skilled in the art would understand that there are numerous other examples of such records.

In a next step 42, a selection is made based upon a record type, which in this example is whether the record is expected to be short-lived and frequently accessed, or alternatively is expected to be long-lived (e.g., permanent) and infrequently accessed. Assuming the record is of the first type, the method proceeds down the left hand column of FIG. 2 to step 43, where an ordered list of hash functions {H0, H2, H1} is assigned to the record. Following a process 44 for sequencing through the list of ordered hash functions, the first hash function H0 is applied to the key at step 45, which produces a logical bucket number 0 . . . n 46. Next, the logical bucket number (which comprises one form of a logical bucket identifier) is translated to a physical bucket location in non-uniform access memory at step 47. Next, the contents of the physical bucket location is read, at step 48, to determine if there is an available slot in this physical bucket location for the record (step 49). If there is, the process proceeds to step 50, adding the record to the physical bucket location in the non-uniform access memory. Next, the bucket is rewritten, and a logical to physical bucket table (described below) is updated with the change, at step 51, and the process is completed. Returning to step 49, if there is no available slot in the physical bucket location, the process returns to step 44 to apply the next (different from the first) hash function of the ordered list of hash functions H2 to the key. This second hash function H2 is the second in the ordered list of hash functions for preferentially mapping the record to a first region of the non-uniform access memory. The second hash function covers the buckets in the logical bucket space not covered by the first hash function H0, namely buckets n+1 . . . m, and the record is allocated to one of the buckets in this space according to the hash function H2 at step 56. Next, the logical bucket identifier is translated to a physical bucket location in non-uniform access memory in step 47. The contents of this physical bucket location is read, step 48, and it is determined whether there is an available slot at this physical bucket location, at 49. If a slot is available, the process proceeds to add the record to the bucket, step 50, rewrite the bucket and update the logical to physical bucket table at step 51, and the process is done. Alternatively at step 49 if there is no available slot, then the processing is repeated from step 44 with the third hash function, otherwise, if all of the hash functions have been applied 57, then the table (index) is full step 58.

Returning to the selection made at step 42, if instead the record type is the second type (e.g., long-lived and infrequently accessed) then the process proceeds as above, but the assigned order (52) in which the hash functions are applied is {H2, H1, H0} so as to preferentially map such records to a second region of the memory.

FIG. 3 illustrates a process 70 for a record lookup according to one embodiment of the invention. Beginning at step 71, a key is provided for the lookup process. The hash function H0 is applied to the key, at 72, and a logical bucket identifier in the span 0 . . . n results from the hash function H0, at 73. Next, the logical bucket identifier is translated to the physical bucket location, at 74, the contents of the physical bucket location are read, at 75, and a search of the physical bucket is made for the value of the key, at 76. If a record having a key value is found in the physical bucket, at 77, then the process returns the record, namely the key and associated data at step 90, and the process is done. If not, the process proceeds (down the center of FIG. 3) to apply a second hash function H2 to the key, at 78, to generate a logical bucket identifier placing the record in one of buckets n+1 . . . m spanning the remaining logical bucket space, at 79. The logical bucket identifier is translated to a physical bucket location in the non-uniform access memory, at 80, the contents of the physical bucket is read, at 81, a search of the physical bucket is made for the value of the key, at 83, and if a record is found at 83, the record is returned at 90 and the process is done. If no record is found at 83, then a third hash function H1 is applied to the key, at 84, the resulting bucket identifier placing the record in one of buckets 0 . . . m, at 85, the logical bucket identifier is translated to the physical bucket location, at 86, the contents of the physical bucket is read, at 87, the bucket is searched for the value of the key, at 88, and if the record is found, at 89, the record is returned, at 90, and the process is done. If no record is found, at 89, then the process ends at step 91.

FIG. 4 shows one embodiment of a process 92 for a record delete operation. Beginning at step 93, a key is provided for lookup processing e.g., according to the methods shown in FIG. 3. If a record is found at step 94, (e.g., one of steps 77, 83 and 89 in FIG. 3) then the process proceeds to remove the record from the physical bucket and reorganize the bucket as required, at 95. Next, the bucket is rewritten and the logical to physical bucket table (described below) is updated, at 96, and the process is complete. If no record is found at step 94, the process is done.

A person of ordinary skilled in the art would recognize that modifications to the methods set forth in FIGS. 2-4, and other methods may be used for record operations, while utilizing the subject matter of the present invention. Thus, the above examples are not limiting and meant only to illustrate certain embodiments of the invention.

The categorization or selection step 42 as previously described, wherein records may be categorized for purposes of applying different ordered lists of hash functions to different types of records, can be implemented by using information received from other processes to determine what hash functions to apply. As an example, a file system writes several kinds of data, such as file data, metadata, bitmaps, and directories. Each of these data types coming from the file system are denoted as such, enabling the process of the present invention to use these data types to preferentially assign the associated records to select storage locations in memory. As one example, file data may be categorized as relatively long-lived and infrequently accessed, while file system metadata may be categorized as short-lived and frequently accessed. Similarly, the storage system itself will have information concerning the performance characteristics of the different regions in memory for use in a selecting step that assigns a storage location in memory based upon one or more of the characteristics of the record and characteristics of the memory region.

In one embodiment, the present invention has a particular advantage in reducing the scavenging overhead of flash memory devices. Flash memory is typically read in 512 byte sectors, written in 8 KB pages, and erased in 1 MB erase blocks. A write is slower than a read, and an erase is slower than a write. The unit for managing flash memory is a 512 byte bucket, and buckets are randomly read, written and updated. An update requires a read, modification and write. Flash memory cannot be overwritten without an erase, so any valid data in the bucket must be written elsewhere to generate a free bucket.

Scavenging is a process where an erase block is inspected and the good data is reads from the erase block and placed elsewhere, freeing up the erase block. This results in extra reads/writes on the system, sometimes referred to as the "write amplification" problem. If not managed properly, the scavenging overhead becomes more expensive in device bandwidth utilization than the initial write traffic (e.g., 2-3× or higher). In accordance with the present invention, this problem is solved by localizing records that are modified more frequently in localized areas of the flash memory. By mapping such frequently modified (short-lived) data to a narrower region of flash, there is less data to be rewritten during an erase block scavenge, thus reducing the write amplification problem.

C. System Architecture, Example

FIGS. 5-9 illustrate one embodiment of a system and method for accessing index records stored in a non-uniform access memory. Further details of such a system and method are described in copending and commonly owned US Publication No. 2010/0332864 to Bowden et al. published 30 Dec. 2010, entitled Scalable Indexing, which is hereby incorporated by reference in its entirety.

Figure 5:
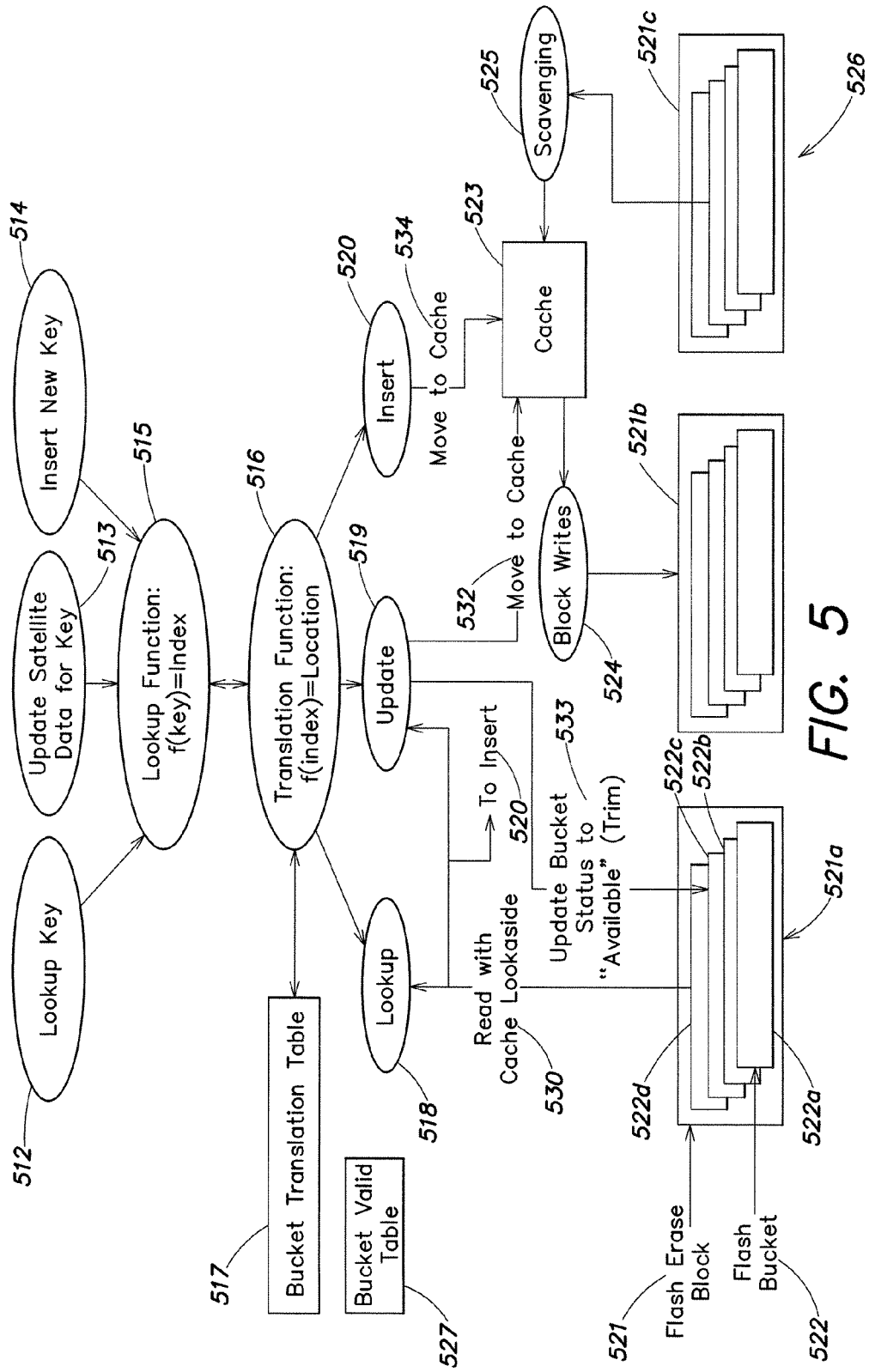
FIG. 5 is a schematic block diagram illustrating various indexing operations according to one embodiment of the invention.

FIG. 5 is an overview of a system architecture for implementing several indexing operations that utilizes a bucket translation table 517 and cache 523. At the top of FIG. 5, three index operations 512-514 are shown as alternative inputs to a lookup function 515 and a translation function 516. A first index operation 512 is "lookup key" for returning satellite data from a record entry for the key. A second index operation 513 is "update satellite data for key" for updating (modifying) the record entry for the key. A third index operation 514 is "insert new key" for inserting a new record entry.

All three index operations first perform a lookup function 515, wherein some hash function is applied to the key f(key) to generate an index, here a logical bucket identifier that supports (e.g., speeds up) a hash table lookup. The logical bucket identifier (index) is input to a translation function 516 wherein some function of the logical bucket identifier f(index) generates a physical bucket location in flash memory 526. The translation function is implemented by a bucket translation table 517, which is a map of the logical bucket identifier (as provided by the indexing algorithm) to a target flash memory location (physical bucket location in flash memory). A dictionary (index) stored in flash memory 526 may comprise records that map a lookup key (e.g., object name) to satellite data (e.g., location pointer to the data stored on disk).

Next, depending upon which of the three indexing operations is being performed (lookup, update or insert) one or more of the steps shown on the bottom half of FIG. 5 are performed.

For a lookup operation 518, the bucket entry identified by the translation function is read 530 from the target bucket 522 in flash memory, with a cache lookaside (e.g., if the target bucket is stored in cache, it may be read from cache 523 rather than from flash memory 526).

For an update operation 519, the bucket entry identified by the translation function (the original bucket entry) is read 530 from a target bucket 522 in erase block 521a of flash memory (or cache), the bucket is updated and moved 532 to cache, and in a subsequent sequential write 524 a plurality of cache bucket entries are read sequentially to a contiguous set of partial pages, multiple pages and/or erase blocks (e.g. a new erase block 521b) in flash memory. The process then updates 533 the status of all the moved buckets in flash to not valid data (e.g., free or available for a trim operation).

For an insert operation 520, a target bucket is again read from flash and a modified bucket entry is moved 534 to cache, again for a subsequent sequential write 524 to a new location in flash memory.

FIG. 5 shows schematically a cache 523 for collecting a plurality of bucket entries, prior to performing a sequential write 524 of the collection of cache bucket entries to contiguous flash memory buckets. In one embodiment, a scavenging operation 525 is used for creating free erase blocks; the process includes storing any valid buckets (from the erase block) in cache during the scavenging process and reallocating the flash erase block as free.

FIG. 6 illustrates various examples of data structures useful in the present embodiment. Such data structures are meant to be illustrative and not limiting.

Figure 6A:
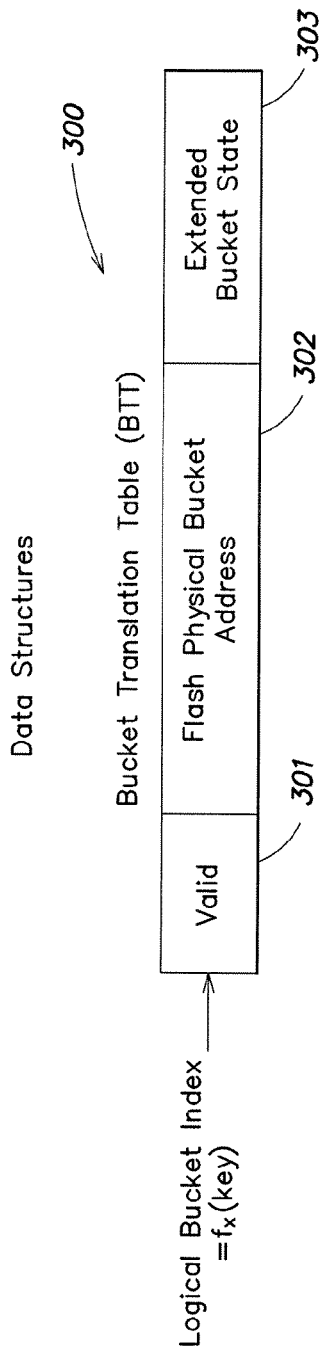
FIGS. 6A through 6D illustrate various embodiments of data structures and system components which may be used in the present invention, FIG. 6A showing a bucket translation table, FIG. 6B showing a bucket valid table, FIG. 6C showing a contents of a bucket in flash memory, and FIG. 6D showing the organization of a NAND flash device.

FIG. 6A shows one embodiment of a bucket translation table (BTT) 300 for translating a logical bucket identifier (generated by an indexing algorithm) to a physical flash bucket address. A BIT table entry is shown having three fields: valid 301; flash physical bucket address 302; and extended bucket state 303. The bucket address granularity may be the minimum write size of the flash device, namely either a partial page write (e.g., for SLC NAND) or a page write (e.g., for MLC NAND). The BTT is a 1:1 mapping of logical to physical bucket entries. The table enables reorganization of the flash bucket assignments for higher random performance (random reads and random writes by the indexing algorithm). Additional state information may be added to the BTT in the third field to enable algorithm acceleration.

Figure 6B:
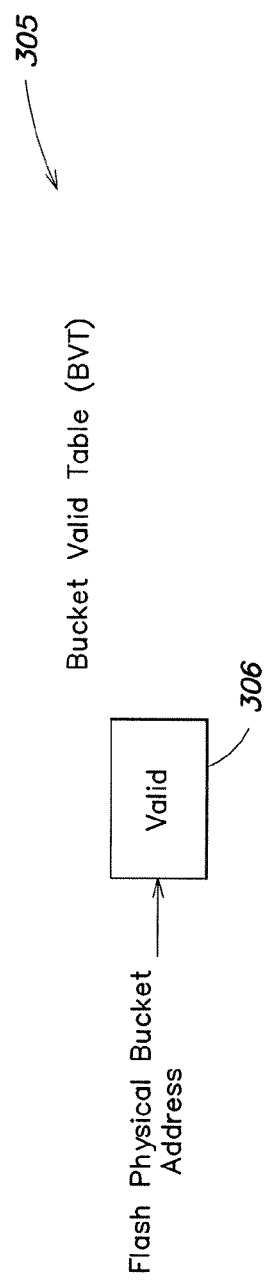

FIG. 6B shows one embodiment of a bucket valid table (BVT) 305. This table tracks which physical buckets in flash are valid in order to manage the scavenging of buckets into blocks for trimming. As one example, a field 306 labeled valid may be a compact bit array (1 bit/bucket). The size of the BVT is the total number of flash bucket entries, only a subset of which are in use by the BTT.

Figure 6C:
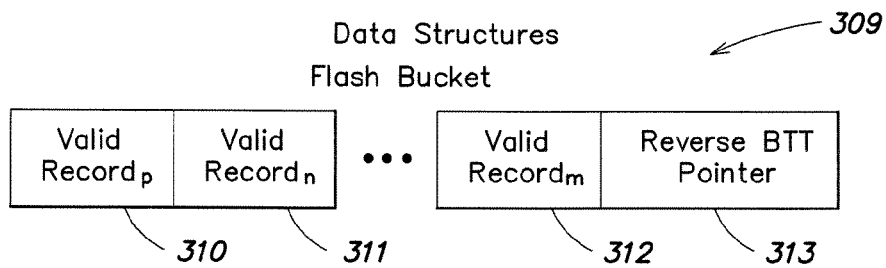

FIG. 6C shows one embodiment of a flash bucket 309 having multiple records 310, 311, 312 . . . included in the bucket, along with a reverse BTT pointer 313 (a self-index into the bucket translation table 517). Thus, each bucket contains a set of one or more records and a reverse pointer for updating the BTT when flash buckets (e.g., pages) are inserted, moved or deleted. Each element of the bucket (record or pointer) may have redundant content added, such as additional ECC bits, to improve the individual reliability of the data structures and significantly increase the useful life of the storage devices. For example, an optional sequence number field may be added to flash bucket 309 for performing data consistency checking during power fail events; other optimization flags may be provided as well.

Because the record size is small relative to the bucket size, this provides an opportunity (optional) to implement additional error recovery information on an individual record basis. This optional feature would improve the overall reliability of the solution by increasing the number of bit errors and faults which may be corrected and thus increase the effective operating lifetime of the underlying storage technology.

Figure 6D:
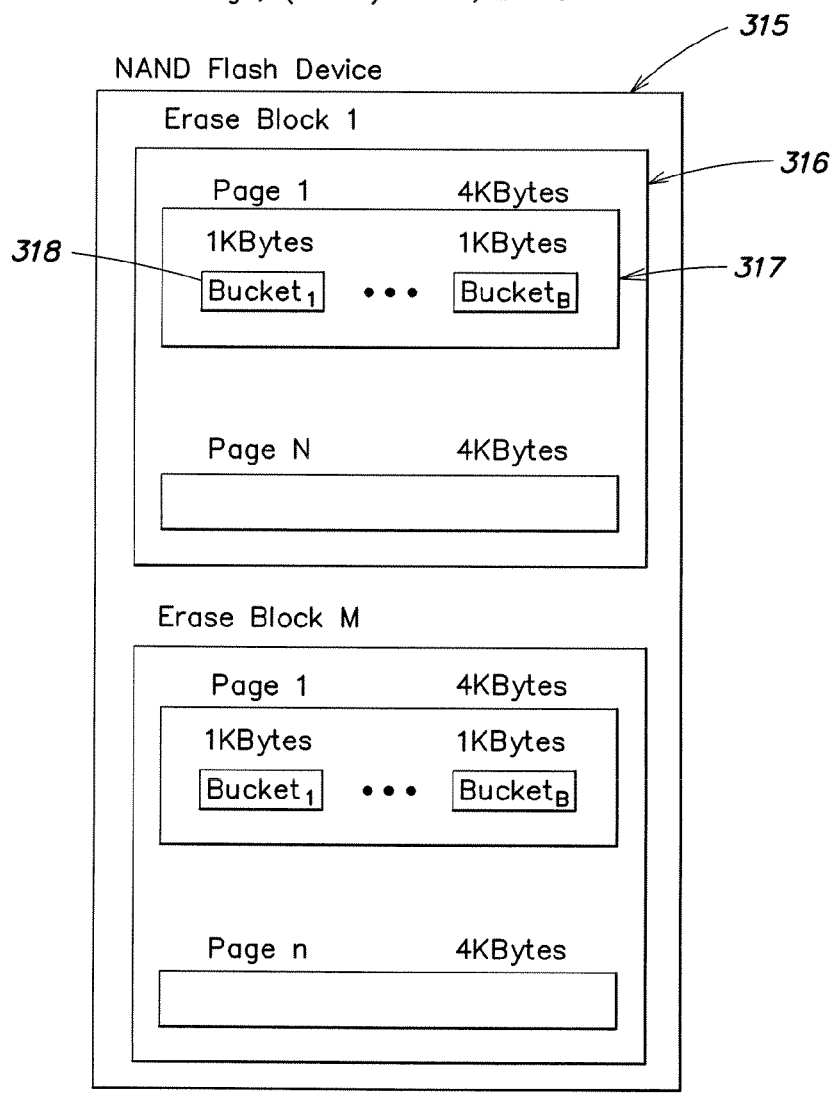

FIG. 6D shows one example of a SLC NAND flash device 315 containing multiple erase blocks 316 (1 to M). Each erase block includes multiple pages 317 (1 to N). In this example, each page is 4 KB and each page includes multiple buckets 318 (1 to B), each bucket being 1 KB. In this example, the device supports partial page writes.

The typical flash subsystem consists of multiple flash devices. NAND flash devices are written sequentially once per page (or partial page) within a given block between erase operations, with multiple blocks available for writing and reading simultaneously.

A bucket represents a minimum write size of the flash device. Typically, a bucket would be a page. If partial page writes are allowed, then one or more buckets per flash page may be provided, such as a four partial page SLC NAND device supporting four buckets per page. Multiple flash pages are provided per erase block. There are multiple erase blocks per flash devices, and each block is individually erased.

Figure 7A:
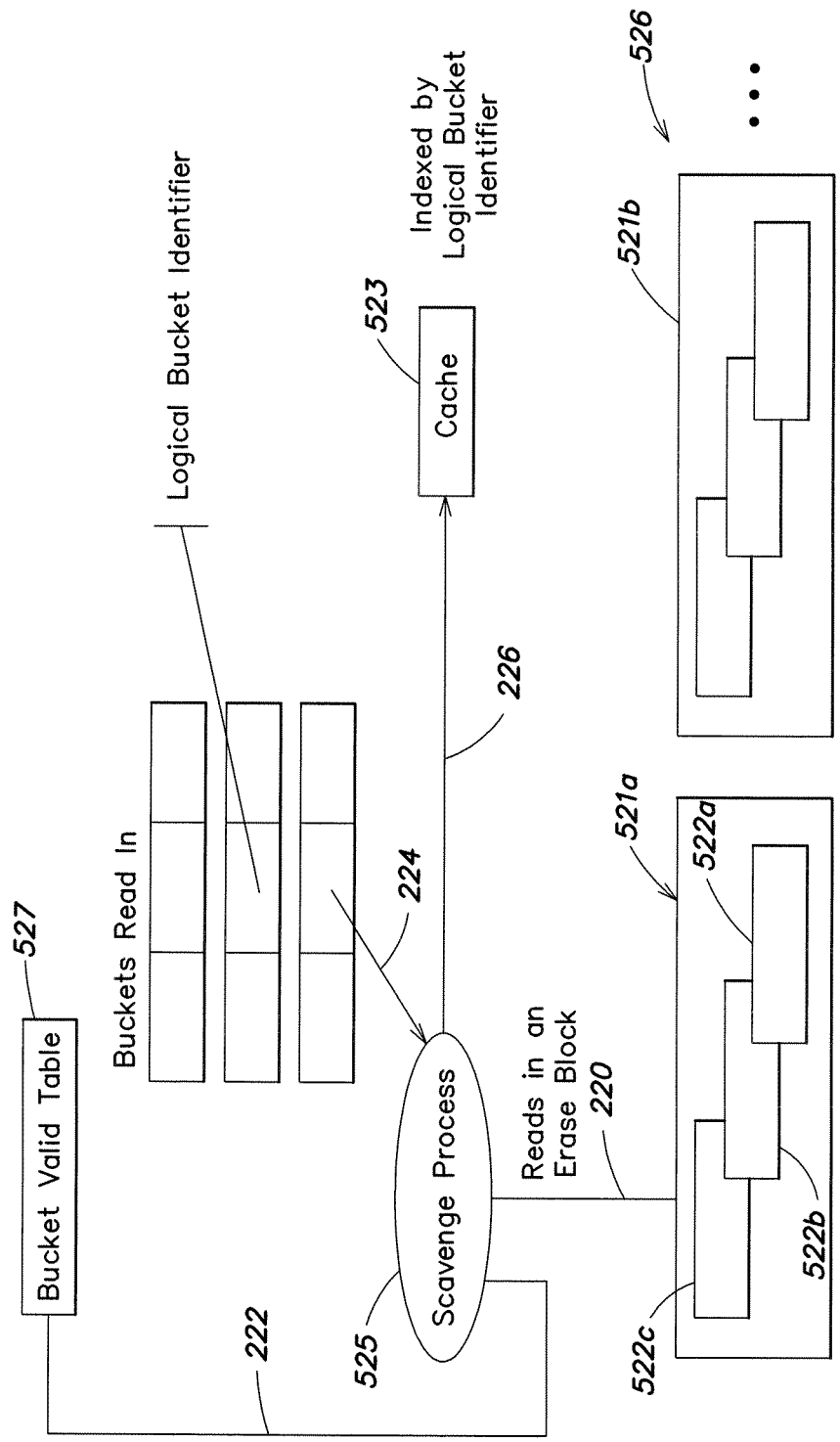
FIG. 7A is a schematic block diagram illustrating one embodiment of a scavenging process.
Figure 7B:
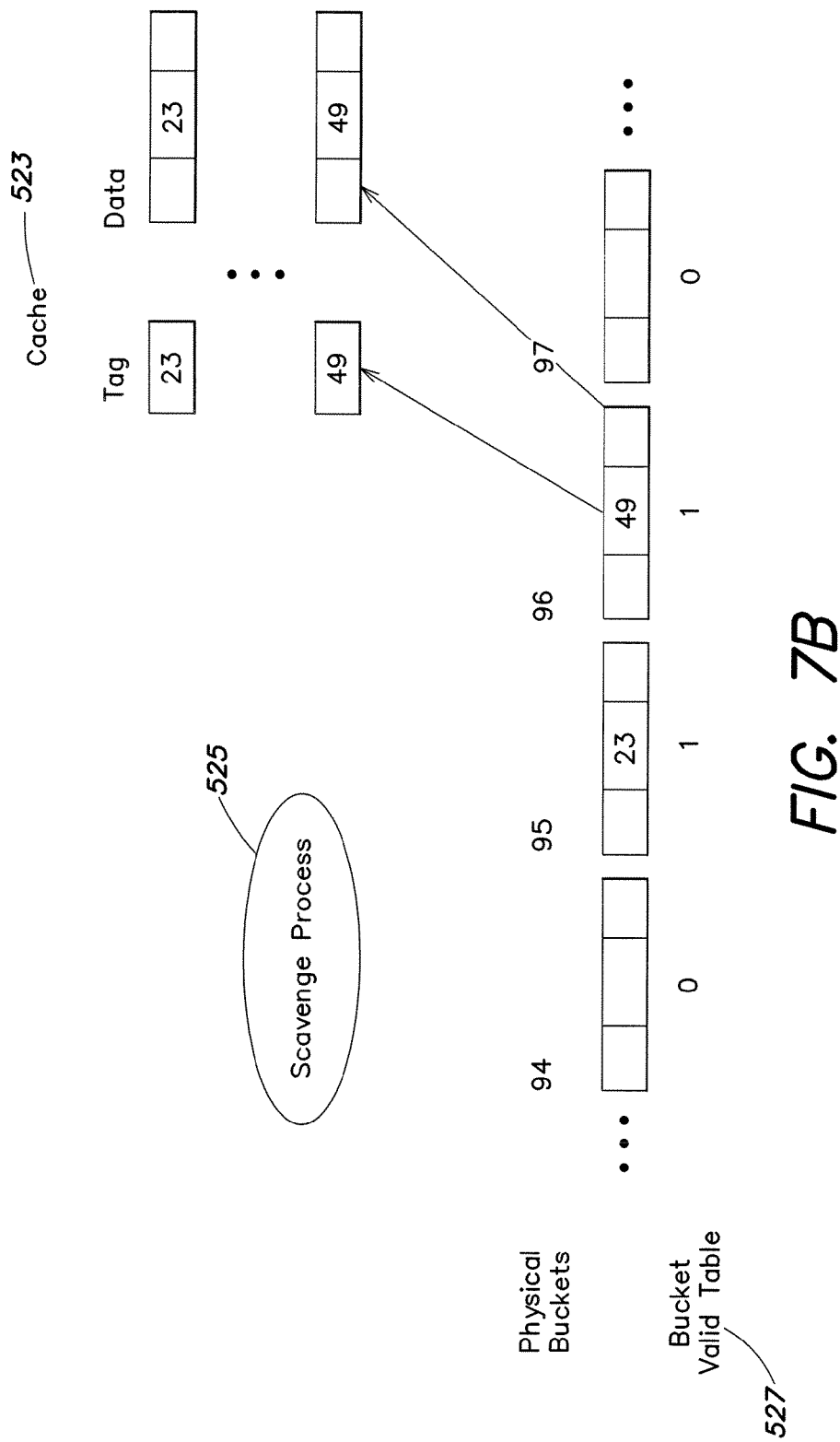
FIG. 7B is a schematic block diagram illustrating one embodiment of a scavenging process.

FIGS. 7A and 7B illustrate one embodiment of a scavenging process for generating free erase blocks. This scavenging process is implemented as part of a lower level device management layer. In this process, a group (some or all) of the physical buckets in a flash erase block are read directly from flash and the bucket valid table 527 is used to determine which buckets in the erase block are valid.

As illustrated in FIG. 7A, in step one 220, a scavenging process 525 reads a complete erase block 521a. In step two 222, the scavenging process uses the bucket valid table 527 to identify all buckets of those read that are valid. In step three 224, for each valid bucket, the reverse BTT pointer 313 in the bucket is used as a self-index into the bucket translation table 517 to return the logical bucket identifiers to the scavenging process. In step four 226, the valid buckets are stored in cache 523, each indexed by its logical bucket identifier.

FIG. 7B illustrates schematically a process in which a scavenging process 525 first reads physical buckets [94, 97] inclusive. In step two, the process determines that buckets at 95 and 96 are valid. In step three, the logical bucket identifiers for buckets 95 and 96, namely tags 23 and 49 respectively, are returned from the bucket translation table 517. In step four, the two buckets 95 and 96 are moved to cache 523 with their respective index tags 23, 49.

Figure 8:
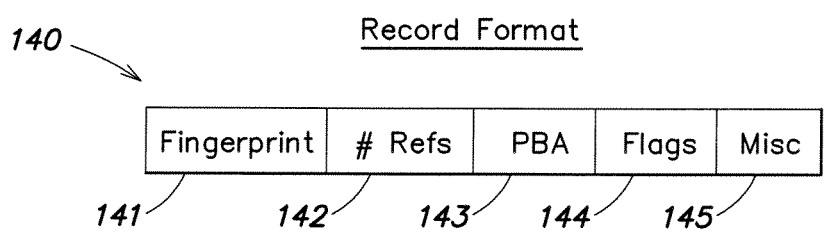
FIG. 8 is a schematic diagram of a record entry as used in one embodiment of the invention.

FIG. 8 shows one example of a record format. The record 140 is 32 bytes in total, including a first 20 byte field 141 for storing a fingerprint (key). The fingerprint may be a cryptographic hash digest of the data content, e.g., an SHA-1 hash algorithm. The fields of the record also include a two byte reference count field 142, a five byte physical block address field 143, a one byte flags field 144, and a four byte miscellaneous field 145. The PBA field 143 contains a pointer to the physical block address of the data stored on disk, for the designated fingerprint 141. The reference count tracks the number of references to the data stored on disk.

Figure 9:
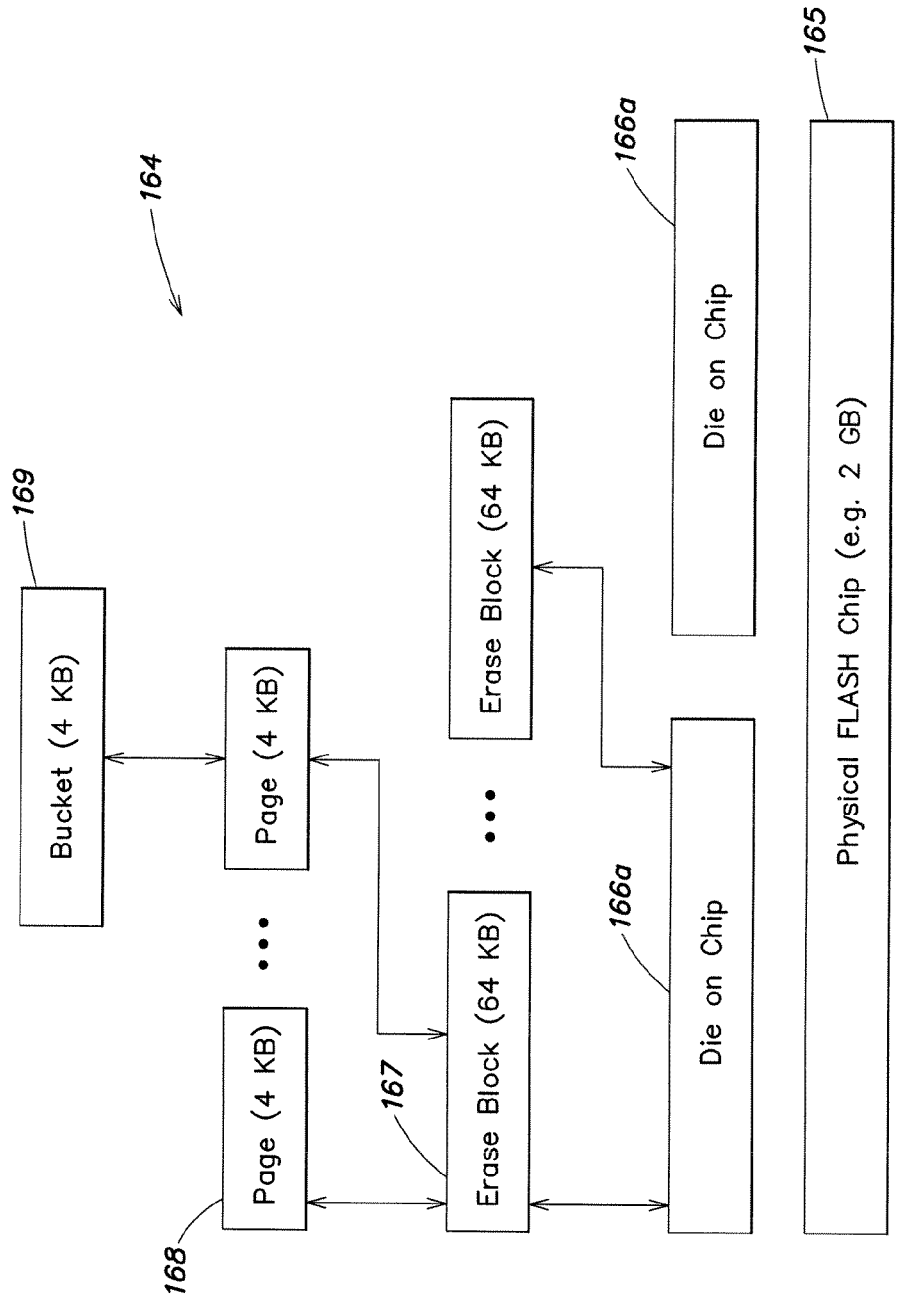
FIG. 9 is a schematic block diagram illustrating one example of a physical flash chip having multiple dies, erase blocks, pages and buckets according to one embodiment of the invention.

FIG. 9 is a schematic illustration of a flash memory device 164 in one embodiment, showing the relative (representative) sizes of a bucket, page and erase block. Here the physical flash device is a chip (package) 165 that is 2 GB in size. On the chip, there are two die (silicon wafers) 166a, 167b. On each die, there may be 2'14 erase blocks, each erase block 167 typically being 64 KB. A page 168 is the minimum size that can be written, here 4 KB, and determines the size of the bucket 169, also 4 KB.

The previously described methods may be implemented in a suitable computing and storage environment, e.g., in the context of computer-executable instructions that may run on one or more computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory. A computer may further include disk drives and interfaces to external components. A variety of computer-readable media can be accessed by the computer, including both volatile and nonvolatile media, removable and nonremovable media. A computer may include various user interface devices including a display screen, touch screen, keyboard or mouse.

Figure 10:
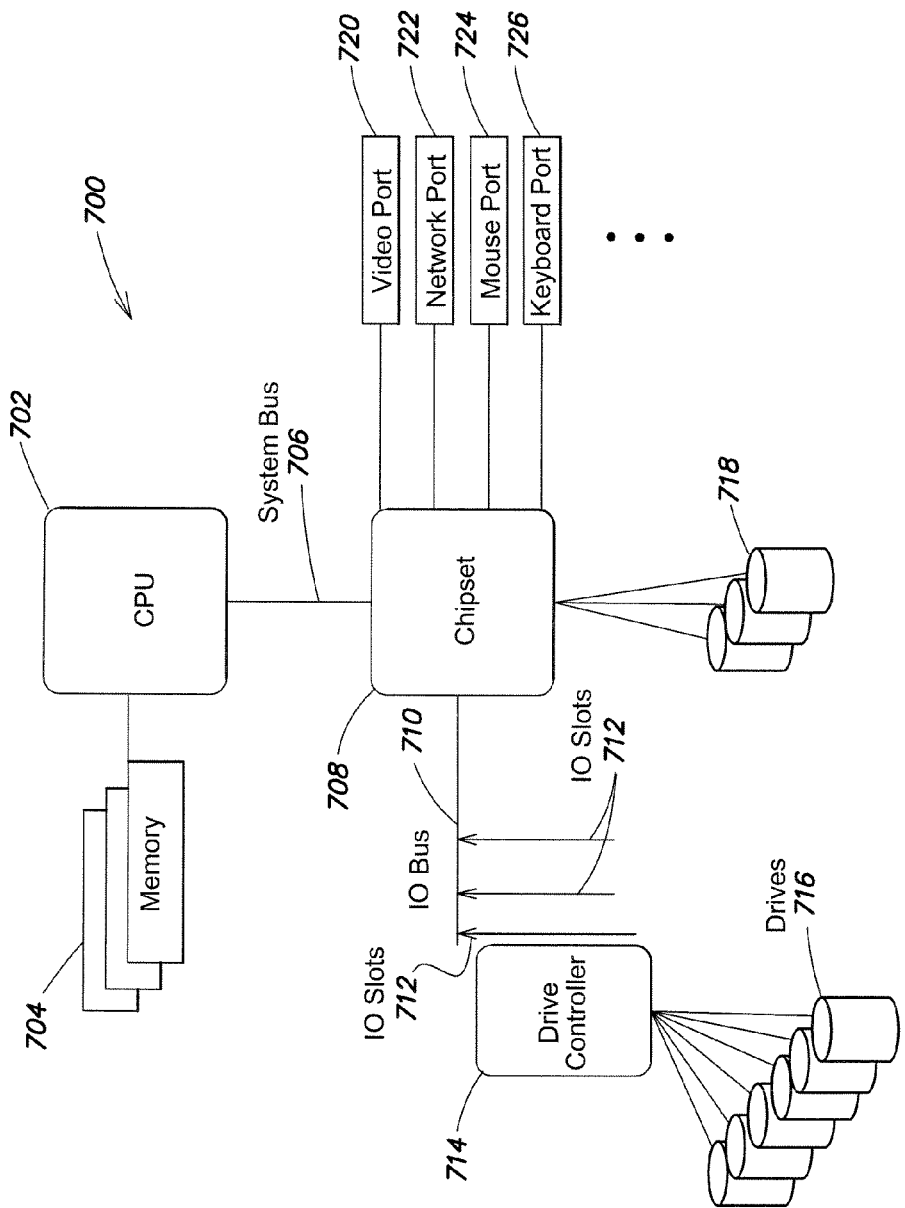
FIG. 10 illustrates one embodiment of a general system configuration for processing and storing data.

Referring now to FIG. 10, there is illustrated one example of a general system configuration 700 for communications between a computer and a plurality of disk storage devices. The disk storage can be any of various storage devices in which data are digitally recorded by various electronic, magnetic, optical or mechanical methods on a surface of one or more rotating disks, including hard disk drives, floppy disk drives and optical disk drives. A CPU 702 is shown attached to system memory 704, and a system bus 706 connects the CPU to chipset 708. The chipset is connected via an IO bus 710 and multiple IO slots 712, to any of various input/output devices, such as a drive controller for connecting a plurality of disk drives 716. The chipset may also be connected to other storage devices 718. The chipset may include one or more of a video port 720, a network port 722, a mouse port 724, a keyboard port 726, etc.

What has been described above includes examples of the present invention. It is, of course, not possible to describe every conceivable combination of components or methodologies for purposes of describing the present invention, but one of the ordinary skill in the art will recognize that further combinations and permutations of the present invention are possible. Accordingly, the present invention is intended to embrace all such alternations, modifications and variations that fall within the present disclosure and/or claims.

The invention claimed is:

1. A method of storing an index for a storage system that stores data elements on disk storage, the index being used by the storage system to access each data element needed by the storage system;

the index comprising a plurality of index records stored in a non-uniform access memory, each record comprising a record key and a pointer to a physical block address on the disk storage where the associated data element is stored, wherein the method comprises inserting a new index record in the index, the method characterized in that inserting the new index includes steps of if the new record is of a first type, the hash value generator applies a first ordered list of hash functions to the associated record key by applying the first hash function in the first list to the associated record key to produce a candidate logical bucket identifier of a logical bucket in a logical bucket space to which the translation component maps a physical bucket location of a first region of the non-uniform access memory, and if there is no available slot in the physical bucket location of the first region, the hash value generator applies the second hash function in the first list to the associated record key to produce a different candidate logical bucket identifier; and if the new record is of a second type, the hash value generator applies a second ordered list of hash functions to the associated record key by applying the first hash function in the second ordered list to the associated record key to produce a candidate logical bucket identifier of a logical bucket in a logical bucket space to which the translation component maps a physical bucket location of a second region of the non-uniform access memory, and if there is no available slot in the physical bucket location of the second region, the hash value generator applies the second hash function in the second ordered list to the associated record key to produce a different candidate logical bucket identifier;

wherein the first hash function in the first list addresses a subset of logical buckets in said logical bucket space so that the first region is localized, and the first hash function in the first list is different from the first hash function in the second list, wherein the second region is different from and not limited to the first region.

2. The method of claim 1, wherein:
the first record type has a greater expected access requirement in the memory than the second record type.

3. The method of claim 1, wherein:
the first record type has a lower expected lifetime in the memory than the second record type.

4. The method of claim 1, wherein:
the first record type has a greater expected referencing requirement than the second record type.

5. The method of claim 1, wherein:
the first region of memory has a faster access characteristic than the second region of the memory.

6. The method of claim 1, wherein:
the first region of memory has a longer expected memory lifetime than the second region of the memory.

7. The method of claim 1, wherein the nonuniform access memory comprise:
computer storage media that have different characteristics including read access time, write access time, write-once limitations, data location or address specific access times, multiple-step writing or reading processes and/or other constraints that result in accesses to different addresses exhibiting materially different access characteristics.

8. The method of claim 1, wherein:
the memory comprises one or more of flash, phase-change, solid state, DRAM and hard disk memory devices.

9. The method of claim 1, wherein:
the memory comprises a flash memory device which includes a plurality of erase blocks, each erase block comprises a plurality of pages, and each page comprising a plurality of buckets.

10. The method of claim 9, including:
performing a scavenging process to generate free erase blocks.

11. The system of claim 1, wherein:
the memory comprises a physical device layer characterized by non-uniform read and write access.

12. The method of claim 1, further comprising:
erasing the first region, including rewriting valid records in the first region to another location in memory and erasing one or more blocks in the first region.

13. The method of claim 1, including:
modifying one or more of:
the number or type of hash functions in the first ordered group of hash functions;
the number or type of hash functions in the second ordered group of hash functions; and
performance characteristics of the first and/or second regions of the memory.

14. The method of claim 1, further including:
performing logical bucket operations for reading and writing to physical bucket locations which store the records.

15. A computer program product comprising program code which, when executed by a processor, performs the steps of method claim 1.

16. A computer system including a server having one or more processors and a memory storing one or more programs for execution by the one or more processors, for performing the method of claim 1.

17. A computer system comprising a processor and program code which, when executed by the processor, places index records in an index stored in a non-uniform access memory, the index being used by a storage system that stores data elements on disk storage to access each data element stored on the disk storage, wherein each record comprises a record key and a pointer to a physical block address on the disk storage where the data element is stored,
the system including:
a non-uniform access memory containing the index records stored in physical bucket locations of the non-uniform access memory;
a hash value generator; and
a translation component;
wherein inserting a new index record in the index includes steps of
if the new record is of a first type, the hash value generator applies a first ordered list of hash functions to the associated record key by applying the first hash function in the first list to the associated record key to produce a candidate logical bucket identifier of a logical bucket in a logical bucket space to which the translation component maps a physical bucket location of a first region of the non-uniform access memory, and if there is no available slot in the physical bucket location of the first region, the hash value generator applies the second hash function in the first list to the associated record key to produce a different candidate logical bucket identifier; and
if the new record is of a second type, the hash value generator applies a second ordered list of hash functions to the associated record key by applying the first hash function in the second ordered list to the associated record key to produce a candidate logical bucket identifier of a logical bucket in a logical bucket space to which the translation component maps a physical bucket location of a second region of the non-uniform access memory, and if there is no available slot in the physical bucket location of the second region, the hash value generator applies the second hash function in the second ordered list to the associated record key to produce a different candidate logical bucket identifier;
wherein the first hash function in the first list addresses a subset of logical buckets in said logical bucket space so that the first region is localized, and the first hash function in the first list is different from the first hash function in the second list, wherein the second region is different from and not limited to the first region.

18. The method of claim 1 wherein the memory comprises flash memory and comprising:
identifying records of a first record type having a lower expected lifetime in memory than a second record type;
applying the first ordered list of hash functions to record keys of the first record type to preferentially map records of the first type to a localized region of the flash memory for reducing the write time during erase block scavenging of the first region.

19. The method of claim 18, further including:
performing a scavenging process to generate free erase blocks in the first region.

20. The method of claim 1, including:
wherein the logical bucket ranges of the different hash functions are mapped to specific memory technologies of the non-uniform access memory having different access characteristics.

* * * * *

UNITED STATES PATENT AND TRADEMARK OFFICE
CERTIFICATE OF CORRECTION

Page 1 of 1

PATENT NO. : 9,165,005 B2
APPLICATION NO. : 13/404640
DATED : October 20, 2015
INVENTOR(S) : Beaverson et al.

It is certified that error appears in the above-identified patent and that said Letters Patent is hereby corrected as shown below:

Claims

In column 12, line 22 (claim 1):
    after "index" insert --record--

In column 12, line 23 (claim 1):
    delete "the" second occurrence and substitute therefor --a--

In column 12, line 28 (claim 1):
    delete "the" and substitute therefor --a--

In column 13, line 31 (claim 13):
    delete "group" and substitute therefor --list--

In column 13, line 33 (claim 13):
    delete "group" and substitute therefor --list--

Signed and Sealed this
Twenty-second Day of March, 2016

Michelle K. Lee
*Director of the United States Patent and Trademark Office*